(12) United States Patent
Nakamura

(10) Patent No.: US 10,809,544 B2
(45) Date of Patent: Oct. 20, 2020

(54) NOSE PAD AND EYEGLASSES PROVIDED WITH THE PAD

(71) Applicant: Shoichi Nakamura, Nagano-ken (JP)

(72) Inventor: Shoichi Nakamura, Nagano-ken (JP)

(73) Assignees: Shoichi Nakamura, Higashichikuma-Gun, Nagano-Ken (JP); ACP JAPAN CO., LTD., Tokyo (JP)

( * ) Notice: Subject to any disclaimer, the term of this patent is extended or adjusted under 35 U.S.C. 154(b) by 119 days.

(21) Appl. No.: 15/947,103

(22) Filed: Apr. 6, 2018

(65) Prior Publication Data

US 2018/0292673 A1  Oct. 11, 2018

(30) Foreign Application Priority Data

Apr. 10, 2017  (JP) ................................. 2017-077314

(51) Int. Cl.
*G02C 5/12* (2006.01)

(52) U.S. Cl.
CPC ....................... *G02C 5/12* (2013.01)

(58) Field of Classification Search
None
See application file for complete search history.

(56) References Cited

U.S. PATENT DOCUMENTS

| 5,737,055 A | * | 4/1998 | Dittmeier | G02C 5/126 |
| | | | | 351/136 |
| 2014/0204331 A1 | * | 7/2014 | Huh | G02C 7/101 |
| | | | | 351/44 |

FOREIGN PATENT DOCUMENTS

| JP | 3136076 A | | 9/2007 | |
| JP | 2008-145924 A | | 6/2008 | |
| JP | 2010-286805 A | | 12/2010 | |
| KR | 20120035349 | * | 4/2012 | G02C 5/02 |

* cited by examiner

*Primary Examiner* — William R Alexander
*Assistant Examiner* — Gary W O'Neill
(74) *Attorney, Agent, or Firm* — Manabu Kanesaka

(57) ABSTRACT

The present invention is to provide a nose pad capable of reducing an imprint after wearing eyeglasses and pain in wearing and preventing the eyeglasses from slipping down, without dropping off from the eyeglasses, a nose pad attached to eyeglasses to come into contact with the nose so as to support the eyeglasses is provided with a base portion that is formed of an elastomer material and that includes surfaces of the pad contacting the opposed nose to come into contact therewith, attachment portions that are formed of a resin material and that are provided at opposite end portions of the backside of the surfaces of the base portion to attach to pad arms extending from the eyeglasses, and bump portions that are formed of an elastomer material and that are provided at opposite end portions of the other surface of the base portion to rise.

2 Claims, 8 Drawing Sheets

NOSE PAD AND EYEGLASSES PROVIDED WITH THE PAD

RELATED APPLICATIONS

The present application claims priority from Japanese Application No. 2017-077314, filed Apr. 10, 2017, the disclosure of which is hereby incorporated by reference herein in its entirety.

TECHNICAL FIELD

The present invention relates to a nose pad for eyeglasses which comes into contact with the nose to support eyeglasses and eyeglasses provided with the pad.

BACKGROUND ART

As an example of a frame of eyeglasses, there is known a frame comprised of a front portion that holds lenses, and temples coupled to opposite end portions of the front portion to be foldable via hinges, where the front portion is provided with a pair of circular rims that holds right and left lenses, a bridge that connects between inner edge portions of both the rims, pad arms extending from respective inner edge portions of the rims, and a nose pad attached to respective front ends of the pad arms so as to enable a direction to be varied in a predetermined range.

In wearing eyeglasses, front ends of the temples are put on ears of a user, while the nose pad comes into contact with opposite sides of the nose, and the eyeglasses are supported. Further, since the variety of the size and shape of the nose of a wearer is wide, the pad arms are formed to be deformable, and by permitting backlash of the direction of the nose pad at the front end of the pad arm, the eyeglasses are adapted to the shape of the nose.

In addition, the present application includes "eyeglasses" and binocular loupes used in medical care and the like, as well as normal "eyeglasses", and these are collectively called "eyeglasses".

Since such a nose pad is a portion to support weights of the eyeglass frame and lenses, a corner of the outer edge portion of the nose pad and the like bite into the nose, and in using for a long time, an imprint and/or pain sometimes occurs.

Particularly, in general nose pads, a surface opposed to the side face of the nose is in the shape of a plane, while the side face of the nose near the root of the nose that is brought into contact with the nose pad is in a gentle concave shape, the side edge portion of the nose pad digs to make an imprint and/or cause pain easily, and there are requirements to alleviate the imprint and pain. Further, it is also required to make the eyeglasses hard to slip down.

Therefore, it is often performed that the nose pad is formed of soft materials made of silicone resin so as to alleviate pain and prevent the eyeglasses from slipping down. Further, proposed are a nose pad to make an imprint hard to remain and alleviate pain by providing cushioning properties and increasing an area of contact with the side face of the nose to disperse pressure as described in Patent Document 1, a pad that is made of soft materials provided with at least one of adsorption properties and permeability to prevent makeup or eyeglasses from being removed or slipping down and that is attached to the nose pad portion of the eyeglasses as described in Patent Document 2, a silicone rubber seal that is provided with a bump band on the surface of the pad coming into contact with the nose to prevent slipping down and that is bonded to the nose pad portion of eyeglasses as described in Patent Document 3, and the like.

PRIOR ART DOCUMENT

Patent Document

[Patent Document 1] Japanese Unexamined Patent Publication No. 2008-145924
[Patent Document 2] Japanese Utility Model Gazette No. 3136076
[Patent Document 3] Japanese Unexamined Patent Publication No. 2010-286805

DISCLOSURE OF INVENTION

Problems to be Solved by the Invention

The eyeglasses provided with the nose pad as described in Patent Documents 1 to 3 have certain effects on alleviation of the imprint left after wearing and pain, removal of makeup and slipping down of the eyeglasses. However, the nose pad as described in Patent Document 1 is large in the contact area, and thereby enables the left imprint and pain to be alleviated, but the effect is not sufficient. Further, the nose pads as described in Patent Documents 2 and 3 have an effect on slipping down of the eyeglasses, but are not matched with the shape of the surface of the nose. Further, since the pad locally contacts to increase pressure, there is a possibility that an imprint is left and/or pain occurs by wearing the eyeglasses for a long time. Furthermore, since the pad is bonded to the nose pad portion of the eyeglasses, there is a possibility that the pad peels off from the nose pad portion unintentionally and drops off.

Accordingly, the present invention is to solve the problems existing in conventional techniques, and to provide a nose pad capable of reducing an imprint after wearing eyeglasses, and pain and a feeling of strangeness in wearing and effectively preventing the eyeglasses from slipping down, without worrying that the pad drops off from the eyeglasses unintentionally.

Means for Solving the Problem

In view of the above-mentioned object, the present invention is to provide a nose pad which is attached to eyeglasses or binocular loupes, comes into contact with the nose to support the eyeglasses, and which is provided with a base portion that is formed of an elastomer material and that includes two contact surfaces coming into contact with the nose, attachment portions that are formed of a resin material and that are connected to pad arms extending from the eyeglasses on the backside side of two contact surfaces of the base portion, and bump portions that are formed of an elastomer material and that are provided at opposite end portions of the two contact surfaces to rise, where each of the bump portions includes a curved convex surface, the resin material of the attachment portions is harder than the elastomer material of the base portion and the elastomer material of the bump portions, and the convex surface is provided with fine concavo-convex or linear embossing processing to increase an area of contact with the skin of the nose and prevent slippage.

It is possible to attach the above-mentioned nose pad to pad arms of eyeglasses with the attachment portions, and therefore, the pad does not drop off from the nose pad portion unintentionally, unlike a seal type nose pad.

Further, since the base portion is formed of the elastomer material and the attachment portion is formed of the resin material harder than the elastomer material, the base portion is flexible to facilitate attachment to the pad arms of the eyeglasses, the attachment portion has durability, and it is also possible to prevent the elastomer portion from discoloring, which occurs due to generation of rust in the case of using metal in an attachment portion.

Furthermore, since the nose pad is provided at its opposite end portions with the attachment portions, when the attachment portions are attached to the pad arms extending from the eyeglasses, not only the opposite end portions of the nose pad come into contact with side faces of the nose, but also the intermediate portion between the opposite end portions comes into contact with a part near the root of the nose. By this means, since the area of contact with the nose is increased to disperse pressure, a left imprint and pain occurs hard, and the eyeglasses are hard to slip down.

Still furthermore, the bump portions with curved convex surfaces are provided on the surface contacting the attachment portions at the opposite end portions of the nose pad and the nose to come into contact therewith, the pad is apt to adapt to the gently dented shape of the side faces of the nose near the root of the nose, and therefore, the eyeglasses are hard to slip down. Moreover, since the pad does not have any corners not to bite into the nose, pain is hard to occur.

In addition thereto, the bump portions are provided, the curved convex surface is provided with fine concavo-convex or linear embossing processing to increase the area of contact with the skin of the nose and prevent slippage, it is thereby possible to form a fine gap between the base portion and the side face of the nose, and therefore, it is also possible to restrain the skin from getting humid and to reduce removal of makeup in the side faces of the nose. Further, since the base portion and bump portions coming into contact with the nose are formed of elastomer materials, texture is good, and slipping is hard to occur.

In the above-mentioned nose pad, although it is preferable that the base portion has the shape of a horseshoe, the base portion may be comprised of two independent right and left bases.

In this case, it is further preferable that the opposite end portions of the base portion provided with the attachment portions and the bump portions are thicker than the intermediate portion positioned between the opposite end portions. By this means, since it is possible to form the intermediate portion to be thin, it is made easier to hide the intermediate portion behind the bridge connecting between rims of the eyeglasses, and it is possible to make the appearance hard to impair.

As one Embodiment, the attachment portions and the bump portions are formed as members different from the base portion, and the bump portions are engaged in the base member. In addition, in the present application, "engage" means that welding, adhesion, bonding or adherence is performed by chemical, thermal or mechanical technique.

The elastomer material of the base portion and the bump portions is one of silicone rubber, urethane rubber, fluororubber, acrylic rubber, ethylene propylene rubber and polyisoprene rubber materials.

Further, as another aspect, the present invention is to provide eyeglasses provided with a front portion that holds lenses, temples coupled to outer edge portions of the front portion to be foldable, a pair of pad arms extending from the front portion, and a nose pad attached to the pair of pad arms, where the above-mentioned nose pad is used as the nose pad, and each fix portion of the nose pad is attached to each pad arm.

In the above-mentioned eyeglasses, the front portion includes a pair of circular rims that hold lenses, and a bridge that connects between inner edge portions of the pair of rims, and it is made possible that the pair of pad arms extend from the inner edge portions of the rims or the bridge.

Further, in the above-mentioned eyeglasses, it is preferable that a box-shaped storage portion with a through hole formed is provided at the front end of the pad arm, a through hole is formed in the attachment portion, and that in a state in which the attachment portion is stored in the box-shaped storage portion, by passing a retaining screw through the through hole of the attachment portion and the through hole of the box-shaped storage portion, the attachment portion is attached to the box-shaped storage portion swingably.

Advantageous Effect of the Invention

According to the nose pad of the present invention and eyeglasses using the pad, since the nose pad is attached to pad arms of the eyeglasses via the attachment portions, the pad is free from risk of dropping off from the eyeglasses unintentionally. Further, the portion coming into contact with the face is formed of the elastomer material, the area of contact with the nose is large, and the bump portion is the curved convex surface without corners and adapts to a gentle dent in the side face of the nose near the root of the nose. Therefore, pain is alleviated, and the eyeglasses are hard to slip down. Further, since the bump portion comes into contact with the side face of the nose, and forms a gap between the side face of the nose and the intermediate portion, it is hard to get humid, and it is also possible to suppress removal of makeup.

In addition thereto, the curved convex surface in the bump portion of the nose pad is provided with fine concavo-convex or linear embossing processing to increase the area of contact with the skin of the nose and prevent slippage, it is thereby possible to form a fine gap between the base portion and the side face of the nose, and therefore, it is possible to suppress heating of the skin and accumulation of sweat, and to also reduce removal of makeup on the side face of the nose.

BRIEF DESCRIPTION OF DRAWINGS

FIG. 8A illustrates concavo-convex embossing processing, FIG. 8B illustrates linear embossing processing, and FIG. 8C illustrates cross line-shaped embossing processing.

MODE FOR CARRYING OUT THE INVENTION

Embodiments of eyeglasses provided with a nose pad according to the present invention will be described below with reference to drawings.

Figure 1:
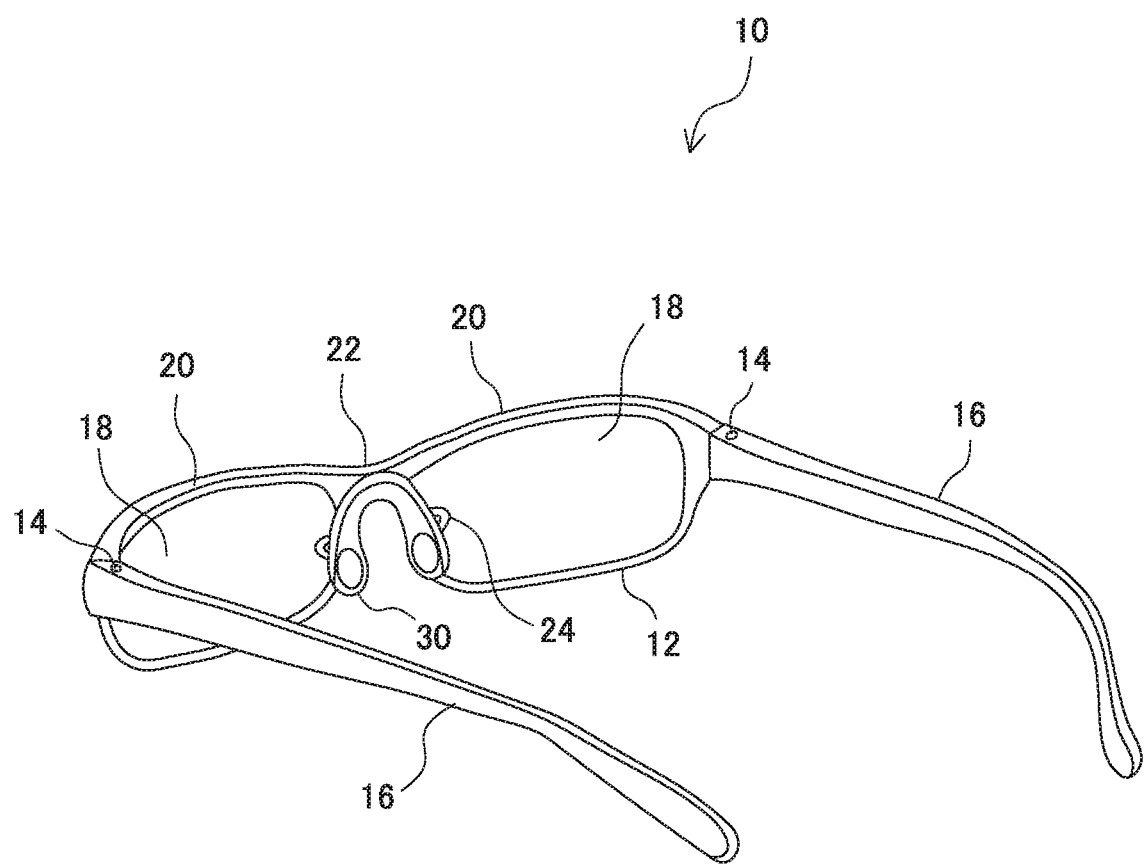
FIG. 1 is a perspective view illustrating an entire configuration of eyeglasses with a nose pad according to Embodiment 1 of the present invention attached.
Figure 2:
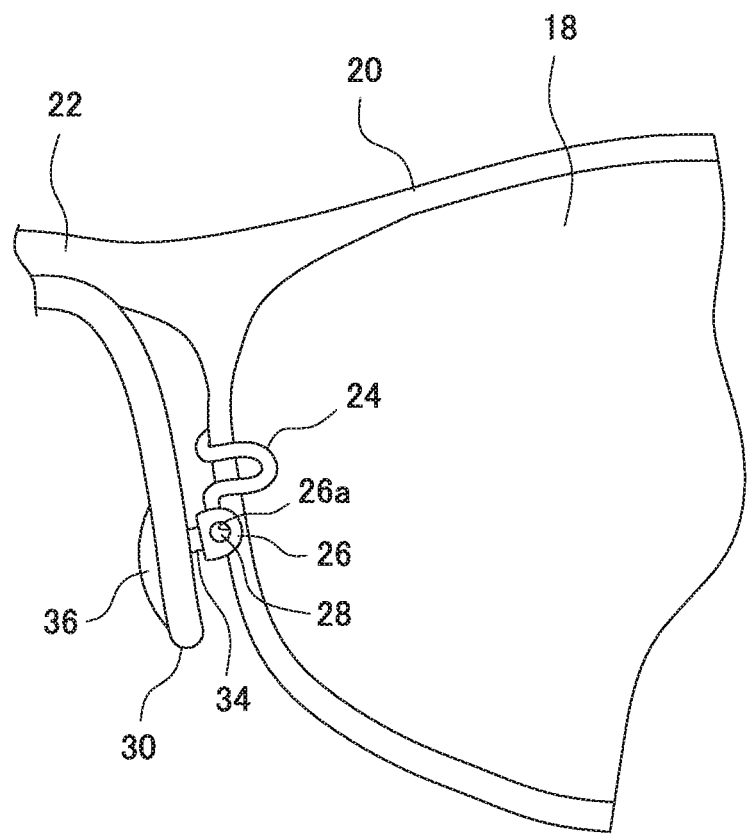
FIG. 2 is an enlarged fragmentary view shown by enlarging a connection portion between a pad arm of the eyeglasses and the nose pad shown in FIG. 1.
Figure 3:
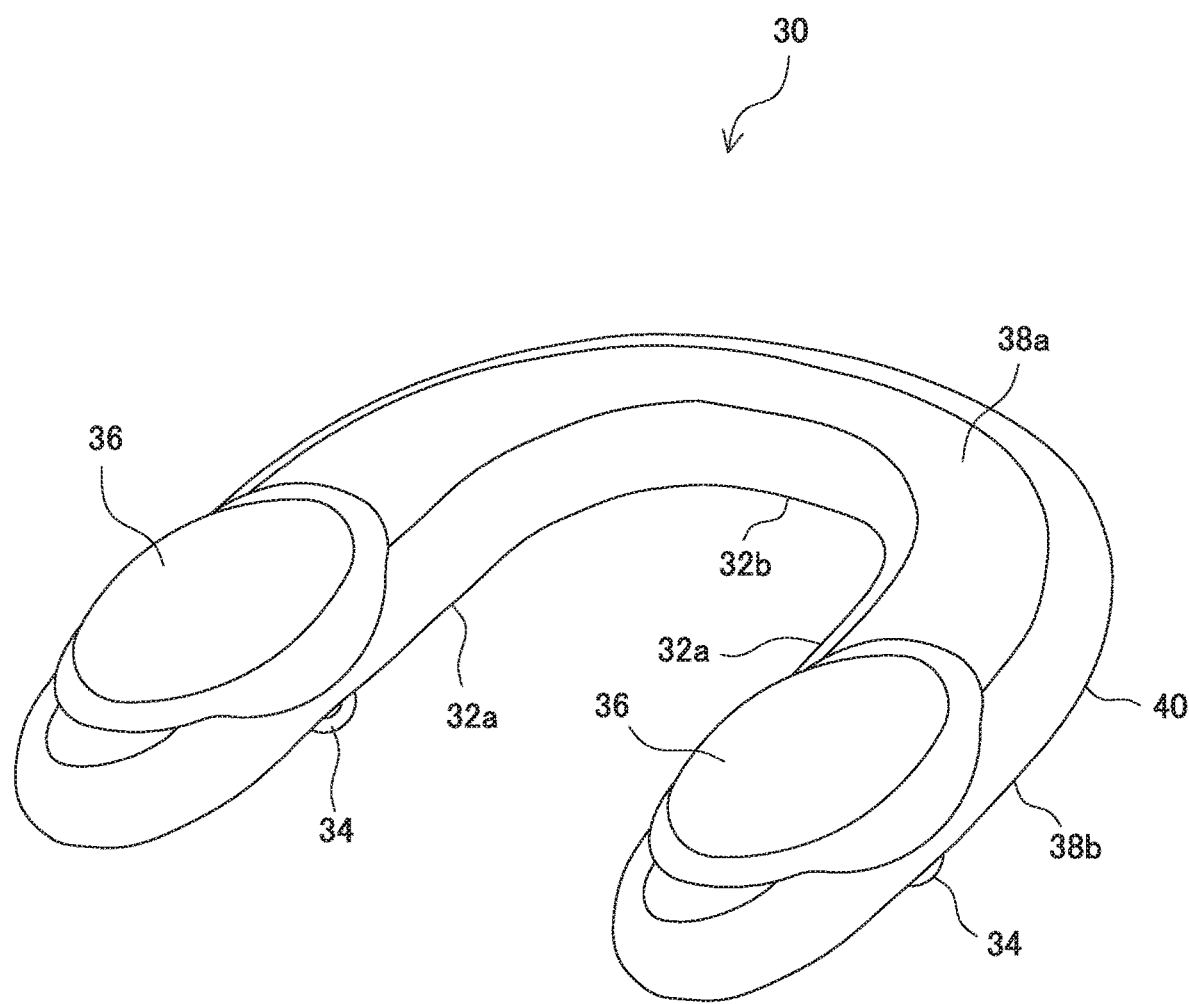
FIG. 3 is a perspective view illustrating the nose pad in a state in which the pad is not attached to eyeglasses.
Figure 4:
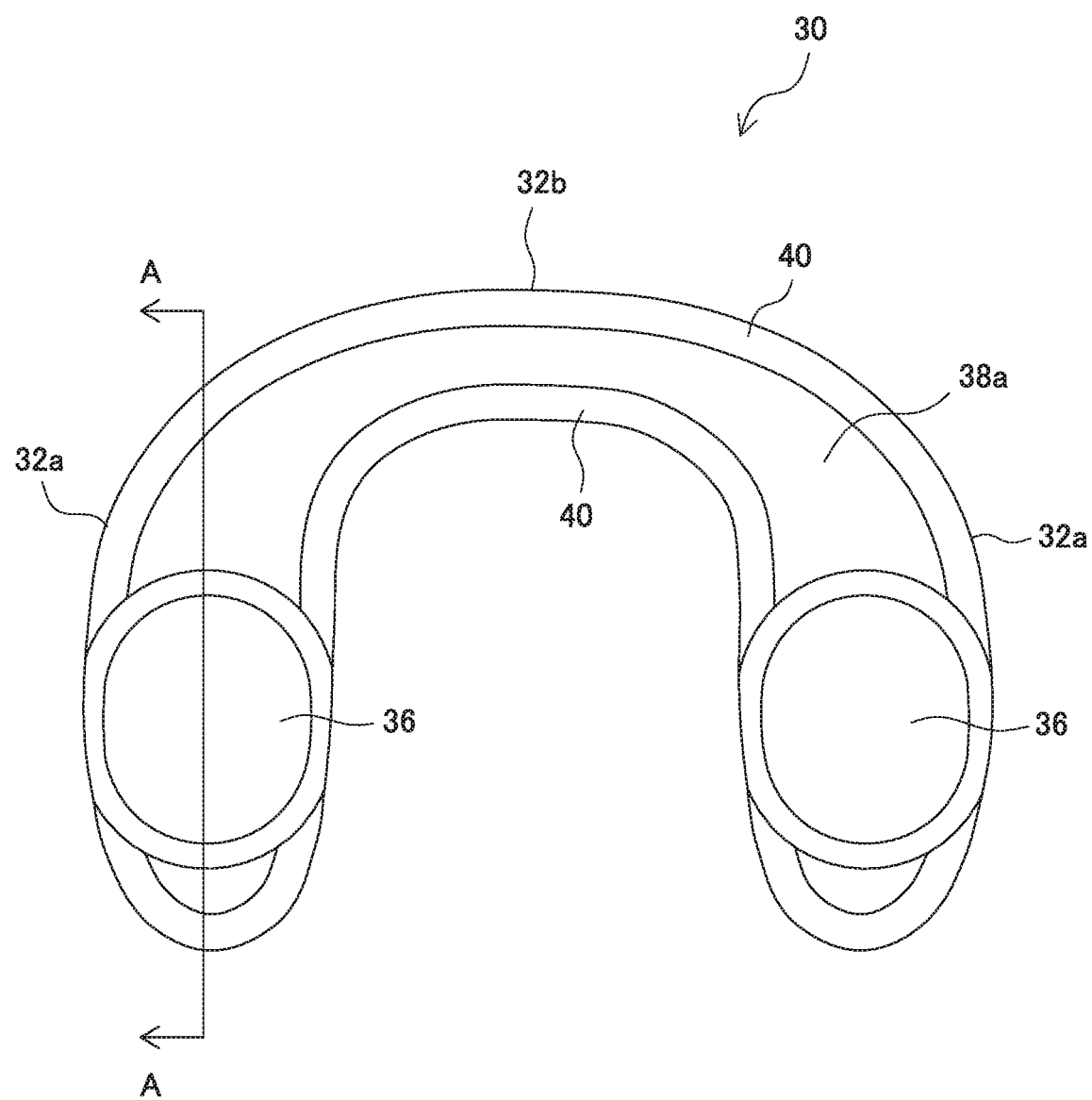
FIG. 4 is a plan view of the nose pad shown in FIG. 3, viewed from the side opposed to the side face of the nose in wearing the eyeglasses.
Figure 5:
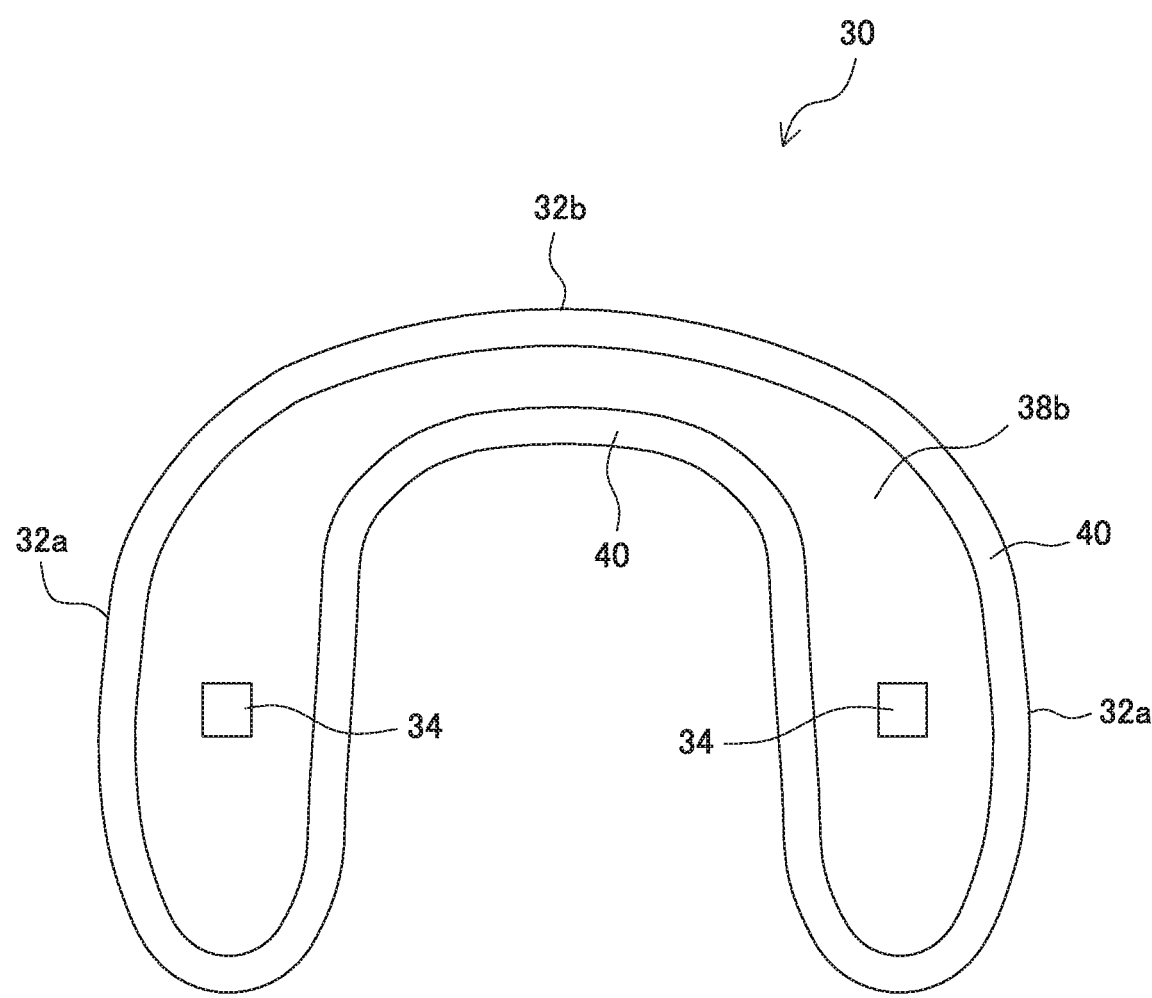
FIG. 5 is a view of the backside of the nose pad shown in FIG. 3, viewed from the side opposite to that in FIG. 4.
Figure 6:
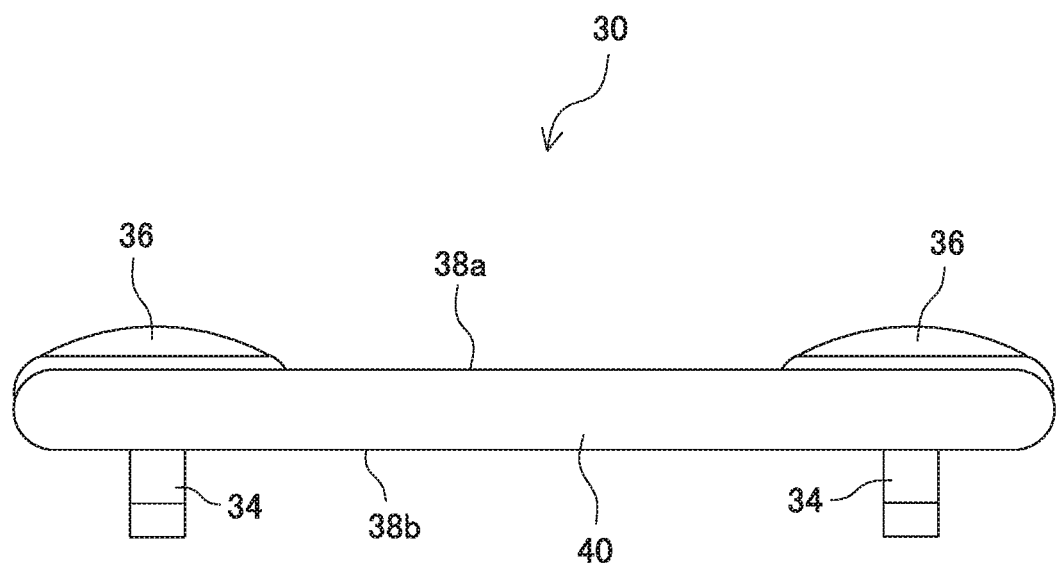
FIG. 6 is a view of the side face of the nose pad shown in FIG. 3.

First, referring to FIGS. 1 and 2, described is an entire configuration of the eyeglasses provided with the nose pad according to the present invention.

The eyeglasses 10 are provided with a front portion 12, and temples 16 coupled to opposite end portions of the front portion 12 to be foldable via hinges 14. The front portion 12 includes a pair of circular rims 20 that hold right and left lenses 18, a bridge 22 that connects between inner edge portions of both of the rims 20, leg members i.e. pad arms 24 extending from the rims 20 or bridge 22, and a nose pad 30 attached to front ends of the pad arms 24 so as to enable a direction to be varied in a predetermined range, and the temple 16 is coupled to the outer edge portion of each rim 20 to be foldable. In the Embodiment shown in the figure, the pad arm 24 extends from near the center in the vertical direction of the inner edge portion of the rim 20.

At the front end of the pad arm 24 is provided a box-shaped storage portion 26, and a through hole 26a is formed in the storage portion 26. An attachment portion 34 of the nose pad 30 described later is stored in the storage portion 26. By passing a retaining screw 28 through a through hole 34a provided in the attachment portion 34 of the nose pad 30 and the through hole 26a provided in the storage portion 26, the attachment portion 34 is attached to the storage portion 26 swingably. By this means, the attachment portion 34 is capable of varying the direction in a predetermined range with respect to the pad arm 24, adapts the direction of a surface opposed to the nose of the nose pad 30 to the side face of the nose having an individual difference to come into contact with the side face of the nose, and supports the front portion 12 together with the temple 16. Further, the pad arm 24 is formed of a deformable material, and as shown in FIG. 2 in detail, preferably has a single or a plurality of curved portions. By this means, it is made possible to deform the pad arm 24 to adapt to shapes of various noses, and adjust the manner of contact between the nose pad 30 and the nose.

Referring to FIGS. 3 to 7, described next is a detailed configuration of the nose pad 30. The nose pad 30 includes a horseshoe-shaped base portion 32, attachment portions 34 protruding from the base portion 32 to connect to the storage portions 26, and bump portions 36 raised from the base portion 32.

The base portion 32 is formed of a flexible elastomer material with elasticity, and has the horseshoe shape including two nose side face opposed portions 32a, 32a extending approximately parallel, and an intermediate portion 32b that connects between two nose side face opposed portions 32a, 32a. As the elastomer material, for example, it is possible to use silicone rubber and the like. It is preferable that the intermediate portion 32b is thinner in width than the nose side face opposed portion 32a. For example, in assuming that the width of the nose side face opposed portion 32a is 8.3 mm, it is preferable that the width of the intermediate portion 32b is 4.5 mm. By such a configuration, it is possible to deform the intermediate portion 32b easier so as to curve to install in the pad arm 24 with ease. Further, the base portion 32 includes two flat frontside 38a of the pad coming into contact with the nose and backside 38b thereof extending approximately parallel, and a curved connection surface 40 that connects between the frontside 38a and backside 38b. The connection surface 40 preferably extends in the shape of an arc. By connecting between two main frontside 38a and backside 38b with the curved connection surface 40, any corner is not formed, the pad is hard to bite into the nose, and such an effect is exhibited that pain occurs hard.

The bump portion 36 is formed of an elastomer material, and is provided to rise from the frontside 38a at opposite end portions (end portions of the side face opposed portion 32a positioned on the side opposite to the intermediate portion 32b) in the longitudinal direction of the base portion 32. It is preferable that the bump portion 36 is raised from the frontside 38a by a height about half the thickness of the base portion 32. For example, when it is assumed that the thickness of the base portion 32 is 2.5 mm, the bump portion 36 is preferably raised from the frontside 38a by 1.3 mm. The bump portion 36 is preferably formed of the same elastomer material as the base portion 32, and as the elastomer material, as in the base portion 32, for example, it is possible to use one of silicone rubber, urethane rubber, fluororubber, acrylic rubber, ethylene propylene rubber and polyisoprene rubber materials. Further, the bump portion 36 has a curved convex surface. In the Embodiment shown in the figure, the bump portion 36 is formed as a different member from the base portion 32, and is welded to the base portion 32, and it is also possible to form the portion integrally with the base portion 32.

Figure 7:
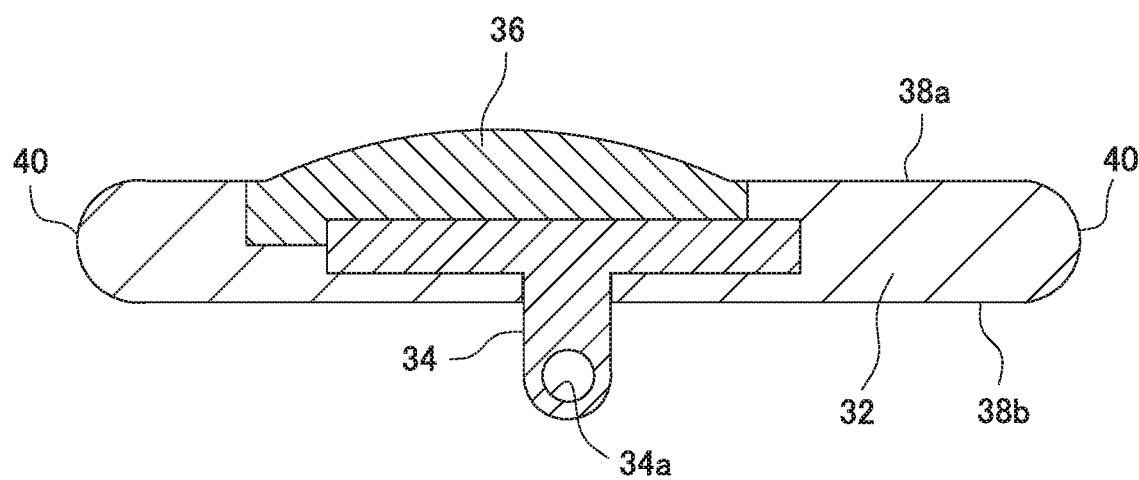
FIG. 7 is a cross-sectional view of the nose pad along the line A-A shown in FIG. 4.

The attachment portion 34 is formed of a resin material harder than the elastomer material forming the base portion 32 and bump portion 36, and is provided to protrude from the backside 38b of the pad surface 38 coming into contact with the nose, at opposite end portions in the longitudinal direction of the base portion 32. The attachment portion 34 is preferably disposed on the intermediate portion 32b side rather than at the center of the bump portion 36. As the resin material, for example, it is possible to use polyethylene, polypropylene and the like. Further, as shown in FIG. 7 specifically, the through hole 34a is formed in the attachment portion 34, and by passing the retaining screw 28 through the through hole 26a of the storage portion 26 and the through hole 34a of the attachment portion 34 in a state in which the attachment portion 34 is stored in the storage portion 26 provided at the front end of the pad arm 24, it is possible to attach the nose pad 30 to the front end of the pad arm 24 to be swingable in the predetermined range. Accordingly, for convenience in attaching to the storage portion 26, it is preferable that the attachment portion 34 protrudes from the backside 38b of the pad coming into contact with the nose by about 2.5 mm. In the Embodiment shown in the figure, the attachment portion 34 includes a disk-shaped foundation portion, and a protrusion portion which protrudes and extends from the foundation portion, and in a state in which the protrusion portion is disposed in a concave portion provided at the end portion of the base portion 32 to protrude from the base portion 32, by welding the member constituting the bump portion 36 to the base portion 32 so as to cover an entrance of the concave portion, is attached to the base portion 32. However, it is also possible to attach the attachment portion 34 to the base portion 32 with an adhesive, or provide integrally with the base portion 32.

In using, the attachment portions 34 at opposite end portions of the nose pad 30 are stored in respective storage portions 26 of the pad arms 24 so that the intermediate portion 32b is disposed on the bridge 22 side, and the nose pad 30 is attached to the pad arms 24. By this means, when a user wears the eyeglasses 10, the nose side face opposed portion 32a of the nose pad 30 is disposed to be opposed to the side face of the nose near the root of the nose of the user, at least a part of the nose side face opposed portion 32a comes into contact with the side face of the nose, and the intermediate portion 32b of the nose pad 30 is disposed to be opposed to the root of the nose and comes into contact so as to cover a part near the root of the nose. Thus, the pad comes into contact with the nose not only in the side face of the nose, but also in the part near the root of the nose, the area of contact between the nose of the user and the nose pad is increased, pressure is dispersed, and therefore, pain due to wearing of the eyeglasses 10 for a long time is alleviated, while the imprint is hard to remain. Further, in addition to that the portion coming into contact with the nose in the nose pad 30 is formed of the elastomer material hard to slide, when the intermediate portion 32b comes into contact so as to cover the part near the root of the nose and shifts in a drop direction, the intermediate portion 32b is caught in the root of the nose, and therefore, the pad also produces the effect that the eyeglasses 10 are hard to slip down.

Further, since the bump portion 36 and the attachment portion 34 are provided at opposite end portions of the frontside 38a coming into contact with the nose and the backside 38b of the base portion 32, respectively, when the attachment portion 34 of the nose pad 30 is stored in the storage portion 26 of the pad arm 24, and the nose pad 30 is attached to the pad arm 24, the bump portion 36 is disposed on the side opposed to the side face of the nose, and in wearing the eyeglasses 10, comes into contact with the side face in the vicinity of the root of the nose in the side face of the nose. While the side face in the vicinity of the root of the nose is a gentle concave shape, the bump portion 36 coming into contact therewith has the curved convex shape, and therefore, is apt to adapt to the shape of the side face of the nose in a region with which the portion 36 comes into contact, and the eyeglasses 10 are hard to slip down. Further, since the bump portion 36 that reliably comes into contact with the side face of the nose and the attachment portion 34 attached to the pad arm 24 are provided in positions that are almost back-to-back at opposite end portions of the base portion 32, the bump portions 36 are capable of reliably nipping side faces of the nose of the user, and the pad also exerts the effect of preventing slipping down.

Furthermore, since the bump portion 36 contacting the side face of the nose to come into contact therewith has the curved convex surface, and is hard to bite into the nose, pain is hard to occur, and the imprint is generated hard. In addition thereto, since the bump portion 36 is raised from the base portion 32, when the bump portion 36 comes into contact with the side face of the nose, a gap tends to be formed between the side face opposed portion and the side face of the nose, and it is possible to decrease the area of contact between the side face opposed portion and the nose. By this means, it is possible to make a rash caused by getting humid occur hard, and to reduce removal of makeup.

Figure 8A:
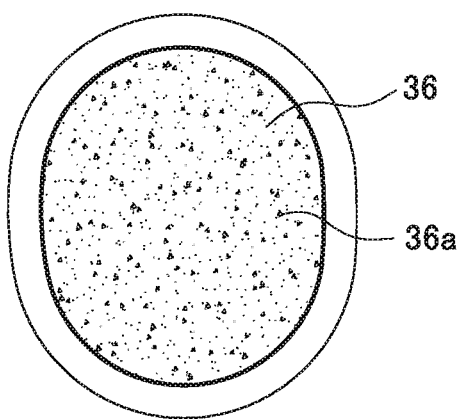
FIGS. 8A to 8C illustrate examples of processing applied to a surface coming into contact with the nose shown in FIG. 4, where
Figure 8B:
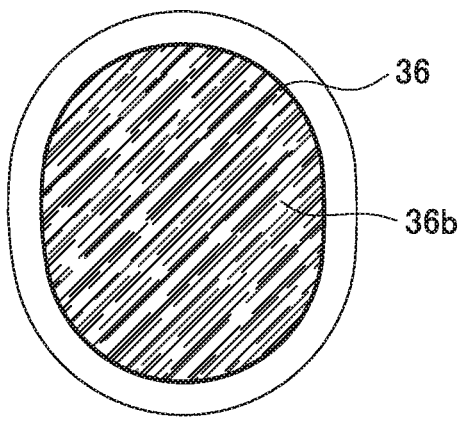
Figure 8C:
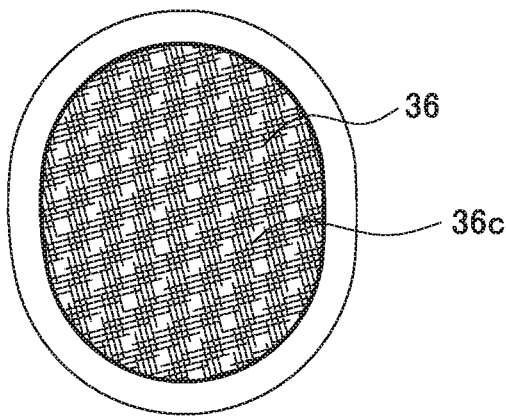

In addition thereto, as shown in FIGS. 8A to 8C, the curved convex surface of the bump portion 36 is provided with fine concavo-convex, linear or wave line-shaped embossing processing to increase the area of contact with the skin of the nose and prevent slippage, it is thereby possible to form a fine gap between the base portion and the side face of the nose, and therefore, it is possible to suppress heating of the skin, and to also reduce removal of makeup on the side face of the nose. FIG. 8A illustrates an example of fine concavo-convex embossing, FIG. 8B illustrates an example of linear embossing at fine intervals, and FIG. 8C illustrates an example of cross line-shaped embossing at fine intervals.

By applying such fine particle-shaped, linear, wave line-shaped and/or cross line-shaped embossing processing to the curved convex surface of the bump portion 36 of the nose pad 30 according to the present invention, in the nose pad according to the invention, as well as the non-slip effect by increase in frictional resistance between the nose pad and the skin of the nose, by preventing the nose pad from coming into intimate contact with the skin, it is made possible to remarkably increase a wearing comfortable feeling of eyeglasses by suppressing sweating and further suppressing accumulation of sweat.

In addition, in the present application, "embossing processing" is not limited to the processing as shown in FIGS. 8A to 8C, and inclusively means all of any types of fine concavo-convex processing applied to the curved convex surface of the bump portion 36.

Figure 9:
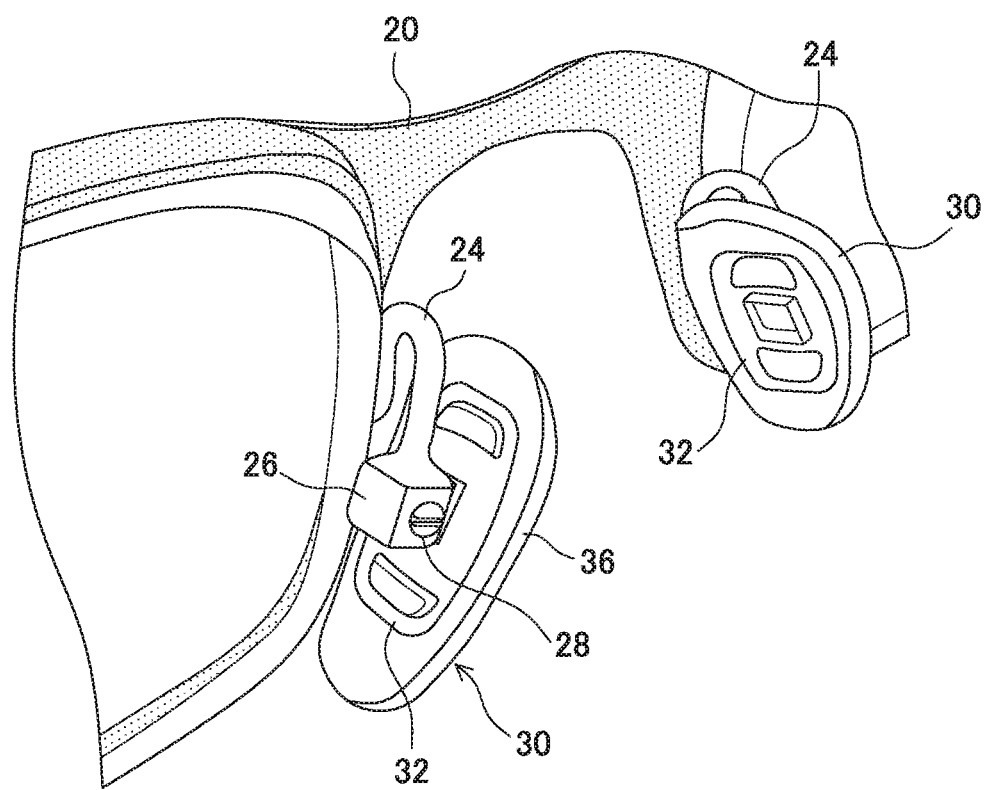
FIG. 9 illustrates a perspective view of principal part of an entire configuration of eyeglasses with a nose pad according to Embodiment 2 of the invention attached.

In the above-mentioned Embodiment 1, the base portion 32 is configured in the shape of a horseshoe, a pair of nose side face opposed portions 32a are continuously configured via the intermediate portion 32b, and the nose side face opposed portions 32a of the base portion 32 may be configured independently in the right and left. FIG. 9 illustrates a nose pad of the Embodiment 2 and eyeglasses. In the base portion 32, on the backside side of the contact surface thereof, the attachment portion 34, which does not appear in the figure, is stored in the storage portion 26, and Embodiment 2 is configured as in Embodiment 1 in the respect that by passing the retaining screw 28 through the through holes respectively provided in the attachment portion 34 and the storage portion 26, the attachment portion 34 is attached to the storage portion 26 swingably.

In the foregoing, the nose pad 30 according to the present invention and eyeglasses 10 provided with the pad are described with reference to Embodiments 1 and 2 shown in the figures, but the invention is not limited to the Embodiments shown in the figures. For example, in the Embodiment shown in the figure, the pad arm 24 extends from the inner edge portion of the rim 20 of the eyeglasses 10, but the pad arm 24 may extend from the bridge 22. Further, in the Embodiment, the nose pad 30 according to the invention is attached to eyeglasses where the front portion has a pair of rims, and it is also possible to attach the nose pad 30 according to the invention to eyeglasses where the bridge and temples are directly connected to lenses without the rim, and the pad arm extends from the bridge. Furthermore, the attachment portion 34 is connected to the storage portion 26 at the front end of the pad arm 24 by the retaining screw 28, and may be connected by another means.

The present application is based on, and claims priority from, Japanese Application No. JP2017-077314 filed Apr. 10, 2017, the disclosure of which is hereby incorporated by reference herein in its entirety.

The invention claimed is:
1. Eyeglasses comprising:
a front portion including a pair of circular rims holding lenses and a bridge extending between upper portions of the pair of circular rims to connect inner edge portions of the pair of circular rims;
temples foldably coupled to outer edge portions of the pair of circular rims;
a nose pad attached to the front portion adapted to come into contact with a nose so as to support the eyeglasses, including:

a base portion that is formed of an elastomer material and that includes nose side face opposed portions with surfaces adapted to come into contact with the nose, bump portions that are formed of the elastomer material and that are provided on the surfaces of the nose side face opposed portions and respectively include curved convex surfaces, and attachment portions that are formed of a resin material harder than the elastomer material of the base portion and the elastomer material of the bump portions and that protrude from backsides of the surfaces of the nose side face opposed portions; and a pair of pad arms extending inwardly from the inner edge portions of the pair of circular rims under the bridge and swingably connected to the attachment portions of the nose pad, wherein the base portion includes two of the nose side face opposed portions disposed substantially parallel to each other, and an intermediate portion connecting between end portions of the two of the nose side face opposed portions so as to form a shape of a horseshoe as a whole, the attachment portions are disposed to be positioned on a side closer to the bridge of the eyeglasses than centers of the bump portions to be back-to-back with the bump portions when the attachment portions are attached to the nose pad, each of the convex surfaces is provided with a concavo-convex surface, the pair of pad arms is formed separately from the front portion and the nose pad, and each of the pair of pad arms includes at least one curved portion between each of the inner edge portions of the pair of circular rims under the bridge and each of the attachment portions of the nose pad in order to easily deform the pair of pad arms.

2. The eyeglasses according to claim 1, wherein the at least one curved portion includes a plurality of curved portions arranged to form a C shape, each of the pair of pad arms includes a storage portion at one end thereof and a through hole in the storage portion, and each of the attachment portions of the nose pad includes another through hole, and each of the pair of pad arms and each of the attachment portions of the nose pad are fixed through a screw inserted in the through hole and the another through hole.

\* \* \* \* \*